United States Patent Office 2,954,364
Patented Sept. 27, 1960

2,954,364
PROCESS FOR PREPARING POLYESTER AMIDES CONTAINING PREFORMED AMIDE LINKAGES

Denis Coleman, Westmount, Quebec, Dora Kraszner, Montreal, Quebec, and Arthur F. McKay, Beaconsfield, Quebec, Canada, assignors to Monsanto Canada Limited No Drawing. Filed Mar. 17, 1958, Ser. No. 721,639

1 Claim. (Cl. 260—75)

This invention relates to the production of new polyester polyamides.

Polyester polyamides may be prepared from mixtures of dicarboxylic acids, diamines and glycols, aminocarboxylic acids, hydroxycarboxylic acids and amino alcohols. However, these polymers have poor thermal and hydrolytic stability, and are low melting and are non-crystalline.

It has now been found that new polyester polyamides without these deficiencies can be obtained by heating ethylene glycol with a compound selected from the group consisting of N,N'-di-(5-carboxypentyl) oxamide, N,N'-di-(6-carboxyhexyl) oxamide, and their methyl or β-hydroxyethyl esters. The latter may be prepared by esterifying the sodium salt of the acid by treatment with ethylene oxide or ethylene chlorohydrin.

The polycondensation takes place by heating the mixture to a temperature preferably within the range from about 130° C. to about 250° C. in the presence of an alkaline catalyst, at atmospheric pressure, with exclusion of oxygen. When using the dimethyl esters as starting materials, the reaction mixture (containing a trace of an alkaline catalyst such as lead oxide or zinc borate) is first heated to a temperature within the range from about 130° C. to about 170° C. until the theoretical amount of methanol is evolved. This step is carried out at atmospheric pressure. The temperature is then raised to within the range from about 180° C. to about 250° C., while the pressure is gradually adjusted from atmospheric to a reduced pressure within the range from about 0.5 to about 1.0 mm. of mercury. After a reaction time within the range from about 5 to about 15 hours at this pressure polymers having a specific viscosity of from about 0.5 to about 3.5 (in m-cresol) are obtained since attempts to prepare other polyester polyamides, under the above conditions, always result in the formation of non-crystalline polymers because of the occurrence of ester-amide interchange. These new crystalline polyester polyamides are unique.

The new polymers can readily be processed by conventional means into valuable fibers, films and injection-moldings. For example, they can be readily spun into continuous fibers which readily cold-draw. The cold-drawn fibers show excellent hydrolytic stability to acids and alkalies. In their resistance to concentrated acids they are much superior to Nylon 6 or Nylon 66. These fibers may be used for the normal fiber uses, for making textile fabrics, as reinforcing cords in belts and similar structures, as the inner layer in gaskets, and so on.

N,N'-di-(5-carboxypentyl) oxamide may be obtained in 90% yield by allowing diethyl oxalate to react at from about 0 to about 5° C. with an aqueous solution of sodium ε-aminocaproate obtained in situ by alkaline hydrolysis of ε-caprolactam. Similarly, N,N'-di-(6-carboxyhexyl) oxamide may be obtained from ω-enantholactam. These acids may be esterified with methanol and sulfuric acid to give the diesters of alternatively the latter may be obtained by esterification of the lactams with methanol and sulfuric acid and condensation of the esters so obtained with oxalyl chloride.

Example I 1050 parts of N,N'-di-(5-carbomethoxypentyl) oxamide and 483 parts of ethylene glycol were heated together with 1 part of lead monoxide under a stream of nitrogen at 130–170° C. for 4 hours. The temperature was then raised to 225° C. and the pressure reduced from atmospheric pressure to 1 mm. of mercury. After 10 hours heating at this pressure the polymer was cooled to a creamy-white crystalline solid (M.P. 160° C.) having a specific viscosity (0.5% in m-cresol) of 3.0.

Example II 1000 parts of N,N'-di-(6-carbomethoxyhexyl) oxamide and 350 parts of ethylene glycol were heated together with 1 part of zinc borate for 4 hours at 150–170° C. The temperature was then raised to 225° C. and the pressure reduced to 0.5 mm. of mercury. After 5 hours heating at this temperature the polymer was cooled to a creamy-white crystalline solid, (M.P. 165° C.) having a specific viscosity of 3.5.

Example III 2000 parts of the di-hydroxyethyl ester of N,N'-di-(5-carboxypentyl) oxamide and 1 part of lead monoxide were heated at 200° C. for 10 hours at a pressure of 0.5 mm. of mercury. The polymer was cooled to a creamy-white crystalline solid (M.P. 160° C.).

We claim:

Crystalline polyesteroxamides of specific viscosity in m-cresol of 3 to 3.5, made by heating one of the group consisting of ethylene glycol and N,N'-di-(5-carboxypentyl) oxamide, ethylene glycol and N,N'-di-(6-carboxyhexyl) oxamide, ethylene glycol and N,N'-(5-carbomethoxypentyl) oxamide, ethylene glycol and N,N'-di-(6-carbomethoxyhexyl) oxamide, beta-hydroxyethyl ester of N,N'-di-(5-carboxypentyl) oxamide, and beta-hydroxyethyl ester of N,N'-di-(6-carboxyhexyl) oxamide at a temperature of from about 130° C. to about 250° C., in the presence of a catalyst selected from the group consisting of lead monoxide and zinc borate, in the absence of atmospheric oxygen and under a pressure from normal to 0.5 millimetre of mercury.

References Cited in the file of this patent

UNITED STATES PATENTS

| | | |
|---|---|---|
| 2,249,950 | Fuller | July 22, 1941 |
| 2,417,513 | Nelles et al. | Mar. 18, 1947 |